March 13, 1945.  W. L. STEFFENS ET AL  2,371,556
COLLAPSIBLE AIR CONDUIT
Filed June 13, 1942
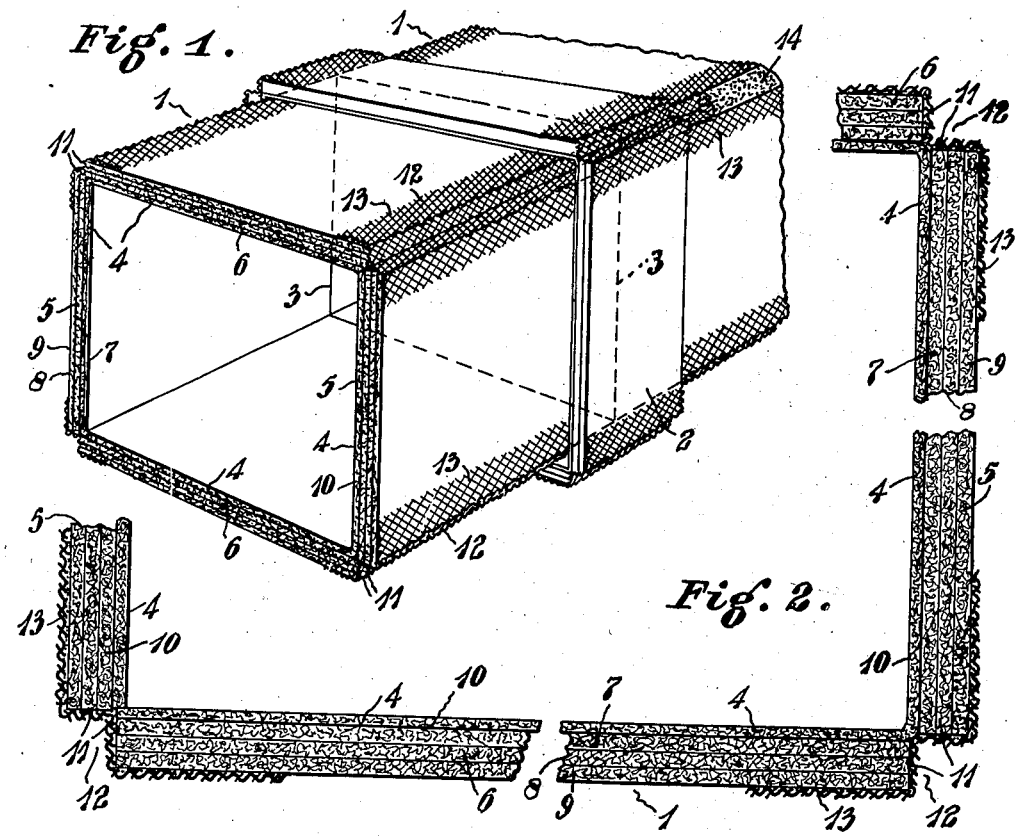
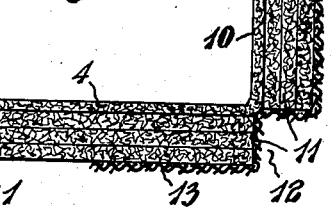
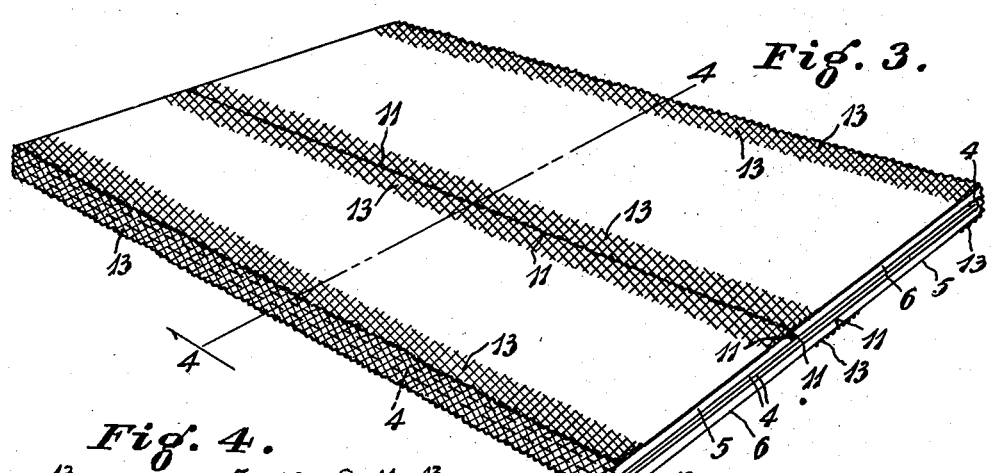
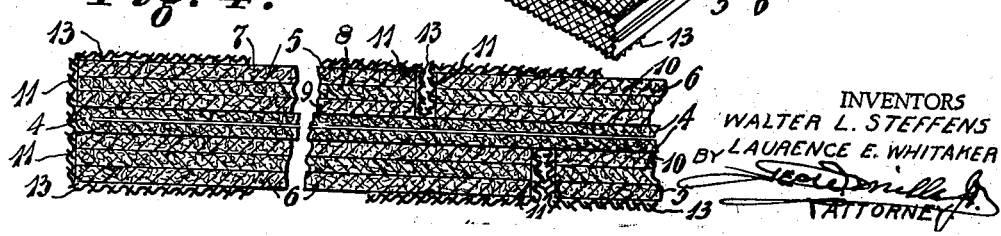
INVENTORS
WALTER L. STEFFENS
LAURENCE E. WHITAKER
BY
ATTORNEY Patented Mar. 13, 1945

2,371,556

UNITED STATES PATENT OFFICE 2,371,556

COLLAPSIBLE AIR CONDUIT

Walter L. Steffens and Laurence E. Whitaker, Wyoming, Ohio, assignors to The Philip Carey Manufacturing Company, a corporation of Ohio Application June 13, 1942, Serial No. 446,920

11 Claims. (Cl. 138—53)

This invention relates to air conduits or pipes and more particularly to conduits or pipes which are adapted to be collapsed in a flat condition for shipment and handling and are then expanded and assembled on the job into conduits from a flat or collapsed condition without requiring more than expanding, fitting the sections together in end to end relation and applying a collar or other suitable securing at the end joint seams.

For a better understanding of the invention, reference may be made to the accompanying drawing, in which:

Fig. 1 is a perspective view of a portion of a conduit or pipe embodying the invention;

Fig. 2 is an enlarged end view of a part of a conduit or pipe section;

Fig. 3 is a perspective view of a collapsed conduit or pipe section; and

Fig. 4 is a cross sectional view on line 4—4 of Fig. 3.

Referring to the drawing particularly, in which like numerals are used to designate like parts, numeral 1 designates generally conduit or pipe sections which are disposed in end to end relation and connected preferably by a collar 2 of the same general construction as the conduit sections, the collar being fitted over the joint seam 3 of the abutting conduit sections. Any other suitable fastening means may be used in lieu of the collar.

The conduit sections comprise a circumferentially continuous core 4 which may be of any suitable material that is flexible and adapted to be folded or bent. Asbestos felt or paper is suitable. One or more plies are wound about a mandrel or otherwise formed in tubular shape to provide a hollow core which is flexible and nonrigid. The core is of any desired shape. It is here shown to be rectangular in shape, preferably with two of the opposite sides somewhat wider than the two other opposite sides. Adhered to the opposite sides of the core member are side pieces 5 and top and bottom pieces 6, these top, bottom and side pieces also being either single or multiple construction. In the instant case the side pieces are comprised of plies 7, 8 and 9 of asbestos sheets; or the side, top and bottom pieces may be a single thick panel, such as asbestos millboard. The sides may be of cement-asbestos or any material which is inherently highly water and fire resistant or has been treated to make them such. The plies are adhesively or otherwise secured together to the sides of the core 4 at 10. Any material, however, is suitable for making the side pieces and various means may be used to secure them to the core.

The longitudinal edges 11 of the side pieces 5 and 6 are squared and form when the sections are expanded or opened from their flat or collapsed condition, grooves 12 at the corners. To reenforce the outside corners of the side pieces and provide smooth edges, muslin or kraft paper strips 13 may be applied along the longitudinal margins of the sides. The reenforcing strips also give a more finished appearance to the conduit sections. They are, however, optional and may be omitted if desired. They serve as a protection and further seal should any breaks occur at the corners of core 3.

In collapsible conduit sections heretofore employed, the corners have been of the same thickness as the other portions of the wall and therefore need to be scored in order to make them flexible enough to bend. This is not suitable in relative thick wall conduits.

The conduit sections, because of the flexibility of the core, can be readily collapsed or flattened to a blank as shown in Fig. 3 for being handled and shipped. Any number of collapsed conduit or pipe sections may be stacked into a bundle or package for handling and shipping, and then opened or expanded on the job where they are assembled into end to end relation to form a conduit.

The inner core 4 is circumferentially continuous and provides a tight seal for the conduit when the sections are expanded, and a hinge for the side members in the collapsed blank. It is very flexible as distinguished from the sides to which the side pieces have been secured.

If desired, the assembled conduit may have plastic cement or a preformed strip 14 applied to fill the outside corner grooves at the juncture of the side pieces. The cement or filling strip can of course be used whether or not the reenforcing strip 13 be employed. Without the reenforcing strips, the cement or filling strip would be applied in contact with the edges of the side pieces. Like the reenforcing strips, the filling strip is optional.

The collar 2 may advantageously be of the same construction as the conduit sections but of sufficiently larger size to fit snugly over the adjacent conduit sections and cover the joint seam between the ends of the conduit sections. If desired, cementing means may be applied to the ends of the conduit sections or the collar may be adhered in position.

By having the conduit sections made up into collapsible blanks which can be flattened out, they can be bundled compactly for shipment and handling without loss of waste space and are considerably less bulky. Yet they are completely constructed and need only be opened or expanded into form suitable for assembly in end to end relation.

Having described the invention, we claim:

1. A collapsible air conduit comprising a circumferentially continuous, flexible core having separate rigid side pieces attached thereto forming walls for the conduit substantially coextensive in length and circumference with the core, said core providing means for flexibly connecting the sides to permit said core and sides being expanded or opened from a collapsed flat blank.

2. A collapsible air conduit comprising a circumferentially continuous, flexible core having separate rigid side pieces attached thereto forming walls for the conduit substantially coextensive in length and circumference with the core, said core flexibly connecting the sides together and permitting said sides and the core to be collapsed in a flat blank.

3. A collapsible air conduit comprising a circumferentially continuous, flexible core having separate rigid side pieces attached thereto forming walls for the conduit substantially coextensive in length and circumference with the core, and squared longitudinal edges formed on the side pieces to provide a recess between the edges of adjacent side pieces when the conduit is expanded.

4. A collapsible air conduit comprising a circumferentially continuous, flexible core having rigid side pieces attached thereto forming walls for the conduit substantially coextensive in length and circumference with the core, and a finishing strip applied to the joint between adjacent edges of the side pieces.

5. A sectional air conduit comprised of collapsible sections disposed in end to end relation and connected by a collar, each of said sections being composed of a substantially continuous, flexible core having separate rigid side pieces attached thereto forming walls for the section and substantially coextensive in length and circumference with the core.

6. Collapsible sections of air conduits adapted to be disposed in end to end relation and connected by a collar, each of said sections being composed of a substantially continuous, flexible core having rigid side pieces attached to said core forming walls for the section and substantially coextensive in length and circumference with the core.

7. Collapsible sections of air conduits adapted to be disposed in end to end relation and connected by a collar, each of said sections being composed of a substantially continuous, flexible core having rigid side pieces attached to said core forming walls for the section and substantially coextensive in length and circumference with the core and a reenforcing corner piece over the edges of adjacent side pieces.

8. A collapsible air conduit section consisting of a circumferentially continuous, flexible core of one or more plies of asbestos paper having separate board like side pieces attached thereto for forming side walls for the conduit sections which are hinged together by the core for permitting the section to be expanded or opened from a collapsed flat blank.

9. A sectional air conduit comprising collapsible sections consisting of a continuous, flexible core of one or more plies of asbestos paper having separate board-like side pieces of fiber board material attached thereto for forming side walls for the collapsible section which are hinged together by the core for permitting the sections to be expanded or opened from a collapsible flat blank.

10. A collapsible air conduit section consisting of a circumferentially continuous, flexible core of one or more plies of asbestos paper having separate board-like side pieces attached thereto for forming side walls for the conduit sections which are hinged together by the core for permitting the section to be expanded or opened from a collapsed flat blank, and a finishing strip adhered to the longitudinal adjacent margins and edges of the fiber board side pieces.

11. A sectional air conduit comprising collapsible sections consisting of a continuous, flexible core of one or more plies of asbestos paper having separate board-like side pieces of fiber board material attached thereto for forming side walls for the collapsible section which are hinged together by the core for permitting the sections to be expanded or opened from a collapsible flat blank, and a finishing strip adhered to the longitudinal adjacent margins and edges of the fiber board pieces.

WALTER L. STEFFENS.
LAURENCE E. WHITAKER.